GRINDING WHEELS

Original Filed July 11, 1958 2 Sheets-Sheet 1

INVENTOR
HUBERT E. WAYLAND,

BY Smith & Mathis

ATTORNEYS

INVENTOR
HUBERT E. WAYLAND,

BY Smucker & Mathis

ATTORNEYS

United States Patent Office

Re. 25,410
Reissued July 2, 1963

25,410
GRINDING WHEELS

Hubert E. Wayland, Knoxville, Tenn., assignor, by mesne assignments, to Tysaman Machine Company, Inc., Knoxville, Tenn., a corporation of Delaware Original No. 2,980,098, dated Apr. 18, 1961, Ser. No. 748,046, July 11, 1958. Application for reissue Aug. 25, 1961, Ser. No. 136,386
8 Claims. (Cl. 125—3)

Matter enclosed in heavy brackets [ ] appears in the original patent but forms no part of this reissue specification; matter printed in italics indicates the additions made by reissue.

This invention relates to grinding wheels, and more particularly to cup grinding wheels utilizing diamond cutter segments for polishing marble slabs.

When polishing the surface of slabs with diamond cutters, those used heretofore have frequently resulted in breakage of the arris, which is the surface of the slab at the edge thereof. The breakage of the arris is characterized by fragments being split off at the edge, causing an unsightly appearance and frequently ruining the entire piece.

In the conventional grinding wheels, the diamond segments have been placed heretofore on the bottom or the face of the wheel. In a construction such as this, the operation of the diamond cutting segments against the surface of the marble tends to wear the peripheral lower edge of the segments on an arc. This necessitates the replacement of some of the segments at irregular intervals, and because of the irregularity in the wearing action, the replaced segments will not wear uniformly. In spite of these disadvantages, however, this practice has been long in existence, and prior to this invention there has been no satisfactory solution to this difficulty.

Accordingly, it is an object of this invention to provide a grinding wheel not subject to the difficulties and disadvantages experienced by conventional grinding wheels of this nature.

Another object of this invention is to provide a diamond cup grinding wheel in which the diamond segments will all wear uniformly.

A further object of this invention is to provide a diamond cup grinding wheel for marble slabs which will not cause breakage of the arris thereof.

These objects are accomplished, according to a preferred embodiment of the invention, by providing a diamond segment mounting plate having a plurality of diamond segments mounted about the periphery thereof. These segments are divided into groups, each group being mounted on a mounting member securely clamped to the diamond segment mounting plate, at the peripheral edge thereof.

The diamond segments are disposed on the mounting members in such fashion that each segment is at a different angle and elevation than any other segment in the group. Generally speaking, the diamond segments should diminish in thickness, proceeding radially outward from the center of the mounting plate. Similarly the angle that the diamond cutters form with the mounting plate should increase, proceeding in a radial direction from the center of the mounting plate, such as to give a flared effect of the cutting edges on the periphery.

By employing this construction, the wear on the diamond segments will tend to be uniform and the arris of the marble slab being polished will be protected from breakage, which heretofore has been a major problem in the polishing operation.

This preferred embodiment of the invention is illustrated in the accompanying drawings, in which.

Figures 1, 2:
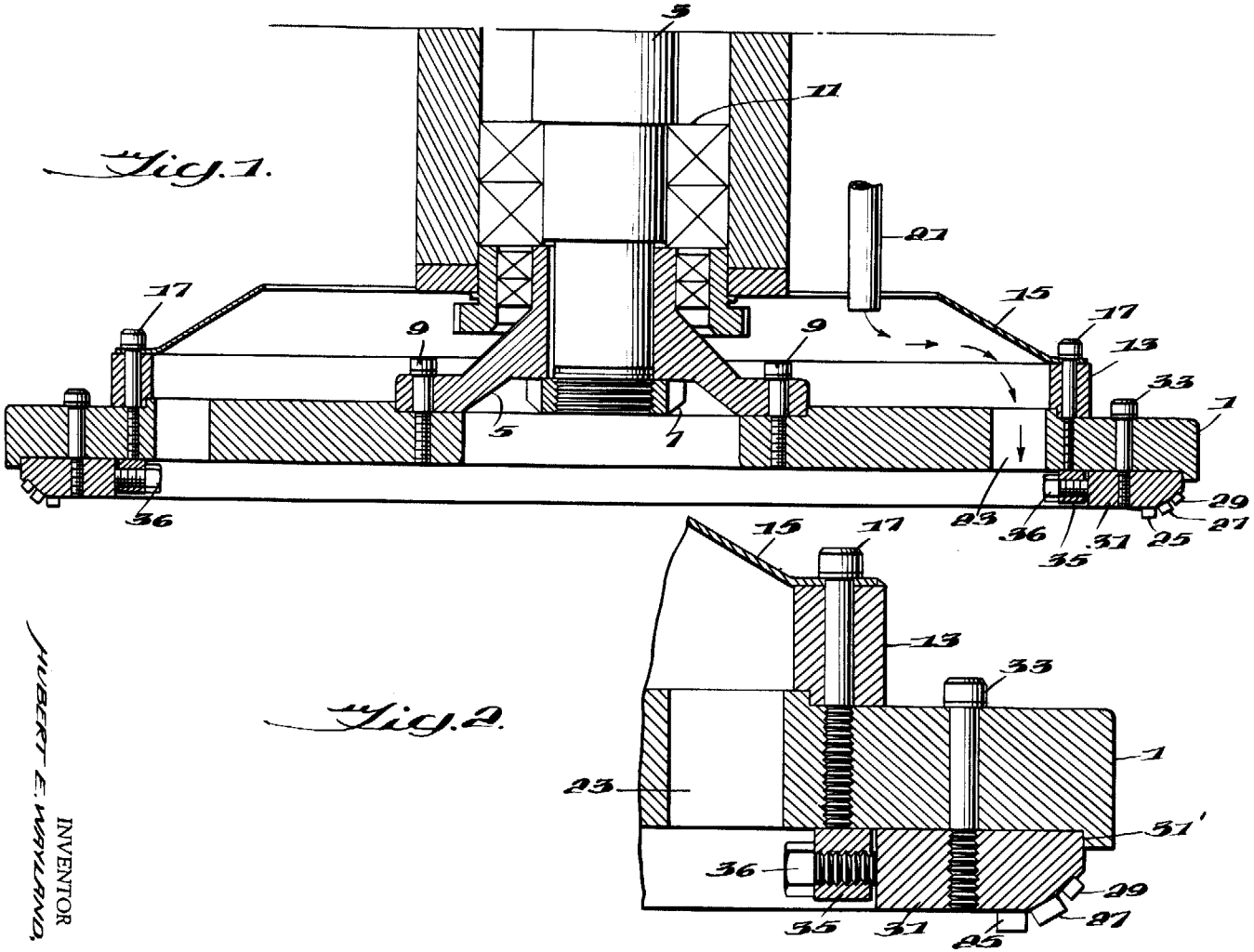
FIG. 1 is a cross sectional view taken along the diameter of a cup grinding wheel embodying this invention.
FIG. 2 is an enlarged detailed view of a group of diamond cutter segments mounted in cutting position.

Referring now to the drawings, a diamond segment mounting plate 1 is shown mounted on spindle shaft 3 by means of a diamond head adapter 5. The head adapter 5 is secured to the spindle shaft 3 by means of bottom bearing clamp nut 7, and is secured to the diamond segment mounting plate 1 by means of suitable fasteners, such as bolts 9. The spindle shaft 3 is provided with appropriate bearings generally indicated by the numeral 11, and is driven by any suitable means, such as a motor, not shown.

Secured to the rear surface of the mounting plate 1 is a circular ring member 13 and an inturned water collar member 15. These members are held in place by suitable fastening means, such as bolts 17. Communicating with the space enclosed by members 13 and 15 is a coolant pipe 21, which is fixedly attached to the main body of the grinding machine and does not revolve with the head. This pipe supplies a coolant, such as water, which is fed through passageways 23 in the mounting plate 1 and is supplied to the diamond cutting segments 25, 27 and 29 by the centrifugal action of the spinning head.

Figure 3:
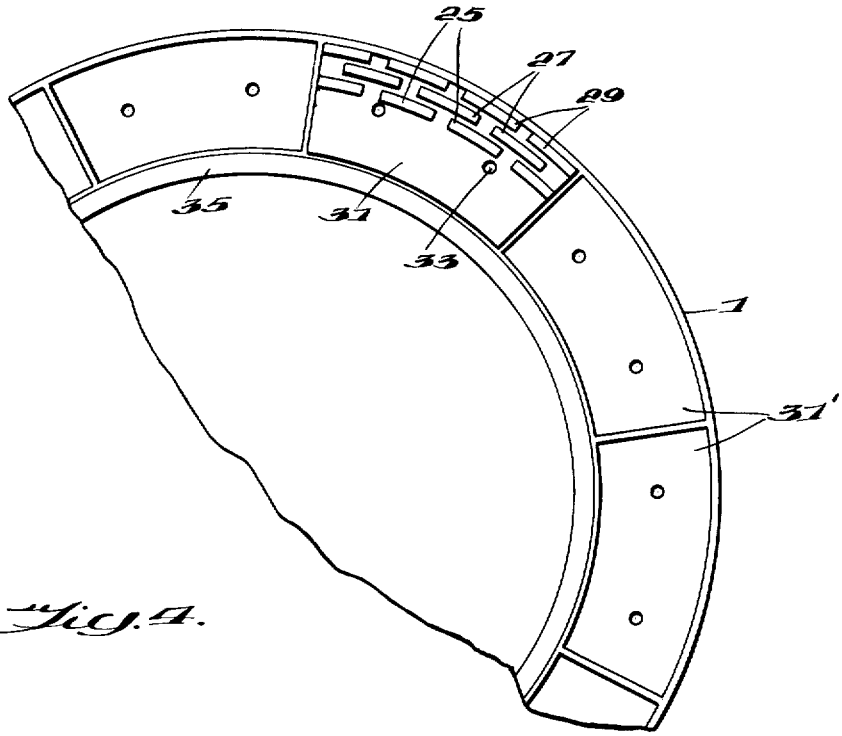
FIG. 3 is a partial bottom plan view of the grinding wheel showing the position of the cutters thereon.

The diamond cutting segments 25, 27 and 29 are secured to respective faces on the bottom and peripheral edge portions of blocks 31, by solder or in any other suitable manner. These blocks 31 are held in place on the mounting plate 1 by suitable means, such as by bolts 33. The blocks 31 are spaced at intervals around the peripheral edge portion of the plate 1 on the bottom face thereof mounted in the respective segmental recesses 31' shown in FIG. 3. Extending around the inner edges of the blocks 31 is a clamping ring 35 having bolts 36 extending therethrough into abutting relation with the inner ends of the blocks 31, as shown in FIGS. 2 and 3. The segments 25, 27, and 29 may be secured in any desired manner to the bottom and peripheral faces of the blocks 31. This ring 35 is secured in place by the bolts 17 or by engagement of the bolts 36 with the blocks 31 or both.

Referring now to FIG. 2, which is a detailed view of the diamond cutting segments and the mounting means therefor, it is seen that these segments 25, 27 and 29 are of different thicknesses and disposed at angles to one another. The cutting segments 25 which are mounted flush with the plane of the bottom face of the mounting plate 1 are the thickest of the group of diamond cutters. The cutting segments 27 which are mounted at an angle with respect to mounting plate 1 are of less thickness than the cutters 25. The angle of mounting of cutters 27 may be varied to suit the particular use to which the head is being placed. However, it has been found that an angle of approximately 30 degrees is satisfactory. The cutting segments 29, which are of less thickness than either cutters 27 or 25, are mounted at an angle of approximately 45 degrees with respect to the mounting plate 1. It is to be understood, however, that the particular angle values given are by way of illustration only and that different uses may require these angles to be varied.

For some applications where the depth of cut is not great, the use of diamond cutters 29 may not be required. In this event, it would then be necessary only to use the cutters 25 and 27.

Figure 4:
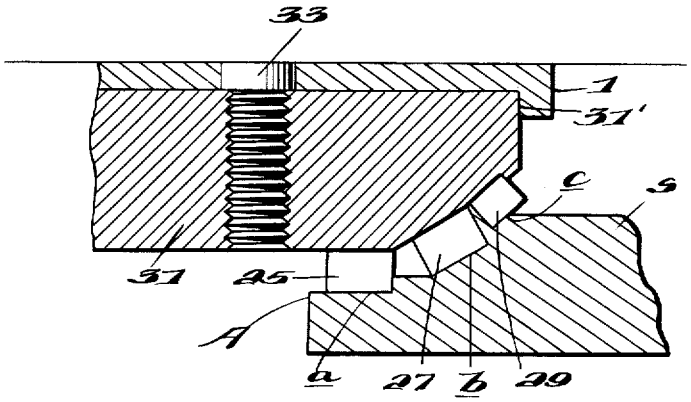
FIG. 4 is a diagrammatic view through a marble slab showing the cutting members in relation thereto.

In the operation of the wheel, the latter is usually applied to the surface of a marble slab, in a direction extending parallel with a lateral edge or margin of the slab, in the manner generally indicated in FIG. 4, wherein the slab is shown at S. The relative thickness of the cuts made by the segments is exaggerated greatly in this drawing, inasmuch as the entire thickness taken off may be as little as one-sixteenth of an inch.

Upon rotation of the wheel about the axis of the shaft 3, the several cutting members will act upon separate portions of the slab, as indicated at a, b, and c, respectively, in FIG. 4, as contrasted from the conventional practices theretofore in which diamond cutting members operated in a single plane parallel with the plane of the wheel and normal to the axis of rotation thereof. This has also caused the inner edge of the surface ground to be somewhat arcuate in cross section, and has resulted in breakage of the arris A or edge of the slab.

By setting the diamond segments at angles to each other, I have eliminated the breakage of the arris, and caused these to wear substantially uniformly, especially when they are initially of gradually diminishing thicknesses from the innermost to the outermost segments. In this way, all of these can be replaced together, requiring stoppage of the wheel at less frequent intervals.

The structure proposed by this invention obviates the above disadvantages and provides a grinding wheel of improved characteristics and performance.

While the invention has been illustrated and described in one embodiment, it is recognized that variations and changes may be made therein without departing from the invention as set forth in the claims.

I claim:

1. A grinding wheel comprising a circular plate, a plurality of metal mounting members secured to said circular plate adjacent the periphery thereof, a circular clamping ring member providing radial support for said metal mounting members, and a plurality of cutter elements mounted on each of said metal mounting members around a peripheral corner thereof, said cutter elements being of different thicknesses and being disposed at different angles and elevations with respect to each other and to the said circular plate.

2. A grinding wheel comprising a circular plate, a plurality of mounting members for cutters abutting against one side face of the plate adjacent the periphery thereof, means for securing said respective mounting members to the plate, a circular clamping ring member at said side face of the plate and in opposed relation to the inner periphery of the mounting members for abutment therewith to confine said mounting members, means for securing the clamping ring member to the plate, and bolts extending radially of the clamping ring in bearing relation to the inner periphery of the mounting members.

[3. A grinding wheel comprising a circular plate mounted for rotation on an upright axis, said plate having peripheral supporting surfaces on the bottom face and around the outer corner portions thereof above the bottom face, the last-mentioned supporting surfaces above the bottom face being disposed in a plurality of different oblique angles with respect to the bottom face, and diamond cutters mounted in the respective supporting surfaces.]

4. A grinding wheel comprising a circular plate mounted for rotation on an upright axis, said plate having peripheral supporting surfaces on the bottom face and around the outer corner portions thereof above the bottom face, the last-mentioned supporting surfaces above the bottom face being disposed in a plurality of different oblique angles with respect to the bottom face, and diamond cutters mounted in the respective supporting surfaces, the cutters on the surface above the bottom face being of progressively less thickness than the bottom face cutter and relative to each other.

[5. A grinding wheel comprising a circular plate mounted for rotation on an upright axis, said plate having peripheral supporting surfaces on the bottom face and around the outer corner portions thereof above the bottom face, the last-mentioned supporting surfaces above the bottom face being disposed in a plurality of different oblique angles with respect to the bottom face, and diamond cutter blocks mounted on the respective surfaces and spaced apart radially about said corner portions.]

6. A grinding wheel comprising a circular plate mounted for turning movement about an upright axis, said plate having a bottom face with one or more recesses therein at the periphery of the plate, and blocks secured in the recess or recesses at the bottom face of the plate, and each having an outer corner edge portion extending upwardly at different angular directions relative to the bottom face of each block, and cutting segments mounted on the bottom face and on the outer corner edge portions of each block.

7. A grinding wheel comprising a circular plate mounted for turning movement about an upright axis, said plate having a bottom face with one or more recesses therein at the periphery of the plate, and blocks secured in the recess or recesses at the bottom face of the plate, and each having an outer corner edge portion extending upwardly at different angular directions relative to the bottom face of each block, and cutting segments mounted on the bottom face and on the outer corner edge portions of each block, said cutting segments having working faces at different angular positions relative to each other.

*8. A grinding wheel comprising a device adapted for turning movement about an upright axis, said device having a bottom face, mounting members abutting against said bottom face, means for detachably securing said mounting members to the device, abrasive cutting segments secured to the mounting members, some of said cutting segments having abrasive surfaces in a plane normal to said upright axis, and others of the cutting segments having abrasive surfaces spaced radially outward from the first-mentioned abrasive surfaces and turned at acute angles to the plane of said first-mentioned abrasive surfaces.*

*9. A grinding wheel comprising a device adapted for turning movement about an upright axis, said device having a bottom face, mounting members abutting against said bottom face and disposed in a row about the peripheral portion thereof, means for detachably securing said mounting members to the device, abrasive cutting segments secured to the mounting members in a plurality of radially spaced rows, some of said cutting segments having abrasive surfaces in a plane normal to said upright axis, and others of the cutting segments having abrasive surfaces spaced radially outward from the first-mentioned abrasive surfaces and turned at acute angles to the plane of said first-mentioned abrasive surfaces.*

*10. A grinding wheel comprising a device adapted for turning movement about an upright axis, said device having a bottom face, mounting members abutting against said bottom face, means for detachably securing said mounting members to the device, abrasive cutting segments secured to the mounting members, some of said*

*cutting segments having abrasive surfaces in a plane normal to said upright axis, and others of the cutting segments having abrasive surfaces spaced radially outward from the first-mentioned abrasive surfaces and turned at a plurality of different acute angles to the plane of said first-mentioned abrasive surfaces.*

References Cited in the file of this patent or the original patent

UNITED STATES PATENTS

| | | |
|---|---|---|
| 122,514 | Bullock | Jan. 9, 1872 |
| 136,432 | Gear | Mar. 4, 1873 |
| 153,568 | Husbands | July 28, 1874 |
| 156,914 | Cottrell | Nov. 17, 1874 |
| 161,835 | Squire | Apr. 6, 1875 |
| 1,461,514 | Burns | July 10, 1923 |
| 1,506,119 | Hansen | Aug. 26, 1924 |
| 1,589,855 | Hyde | June 22, 1926 |
| 1,734,012 | Jeppson | Oct. 29, 1929 |
| 1,897,546 | Birghauer | Feb. 14, 1933 |
| 2,105,872 | Warner | Jan. 18, 1938 |
| 2,633,682 | Jackson | Apr. 7, 1953 |
| 2,716,312 | Speicher | Aug. 30, 1955 |
| 2,867,063 | Metzger | Jan. 16, 1959 |
| 2,985,989 | Knost | May 30, 1961 |
| 3,013,784 | Osgood | Dec. 19, 1961 |

FOREIGN PATENTS

| | | |
|---|---|---|
| 245,470 | Germany | Sept. 8, 1910 |
| 669,776 | Germany | Jan. 4, 1939 |